United States Patent Office 3,201,788
Patented Aug. 17, 1965

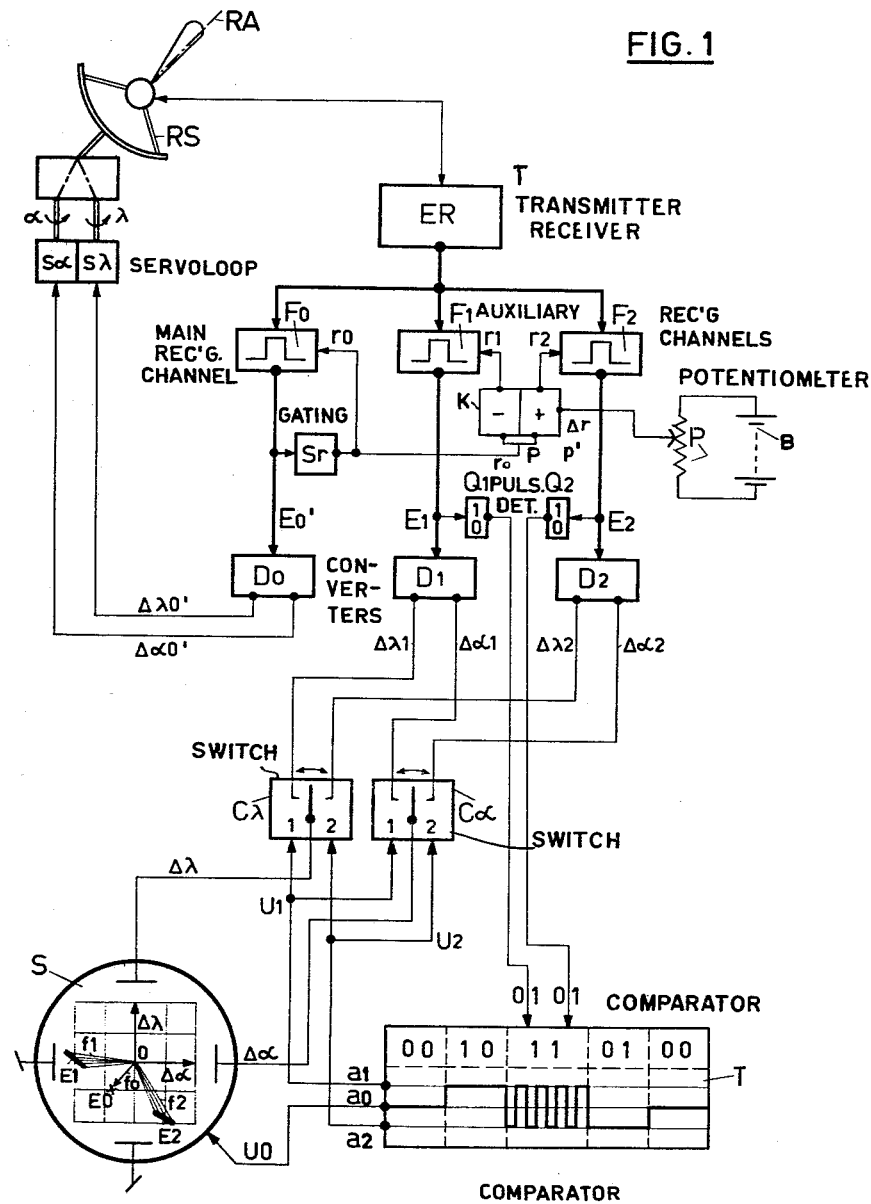

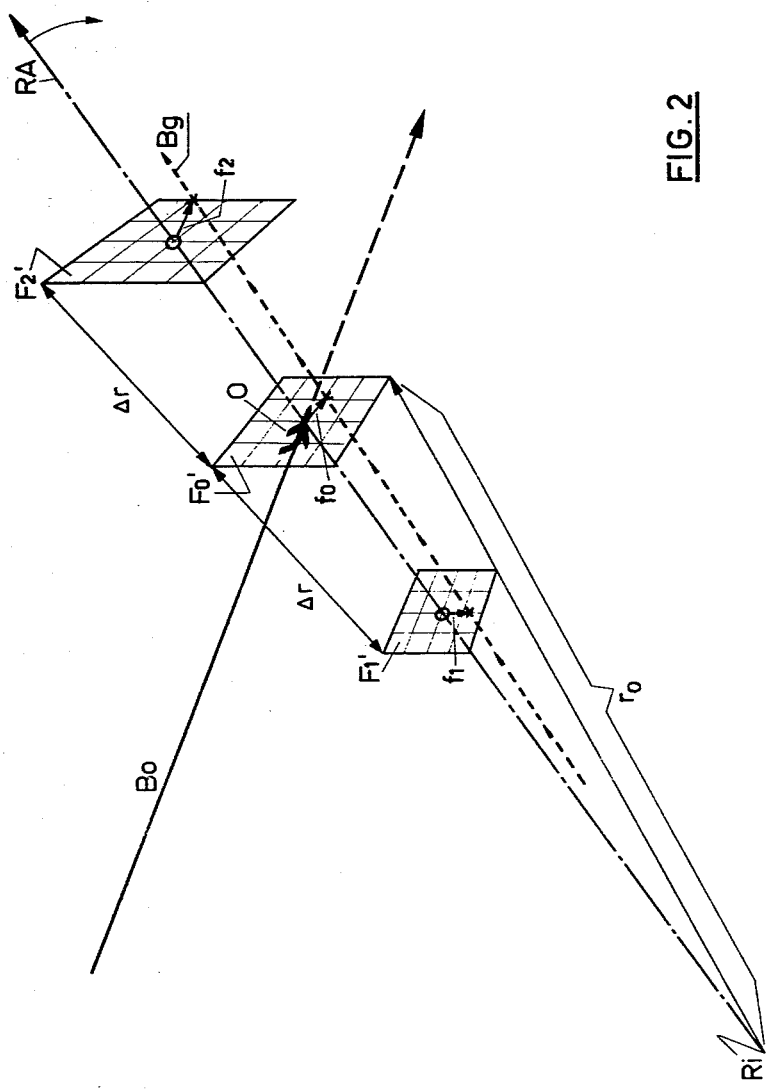

3,201,788
APPARATUS FOR FINDING THE RELATION BETWEEN A MISSILE TRAJECTORY AND A TARGET
Helmut Hertwig, Bonn, Germany, assignor to Contraves A.G., Zurich, Switzerland
Filed Aug. 28, 1961, Ser. No. 134,423
2 Claims. (Cl. 343—7.3)

The present invention refers to the tracking of an object by means of a radar beam and to the determination of the relation between the tracked object and another object traveling along a trajectory passing through the region in which the first object is located.

More specifically, the invention concerns a method and apparatus for determining the accuracy of the trajectories of missiles directed at a moving target which is being tracked continuously.

In radar scanning and tracking the detection of an object like a target or a missile depends on the reception of echo signals caused by the impact of an emitted signal on the particular object. It has been found, that it is practically impossible to detect echo signals caused by a missile which passes by the target at a close distance, and even less if the missile hits the target. In both cases the echo signal caused by the target would be blended with the echo signal caused by the missile. On a radar screen the two signals could not be distinguished. A contributing factor in this difficulty is the fact that radar tracking apparatus usually includes gating means which prevent response of the signal receiving channel to echo signals caused by objects located at a distance from the radar antenna differing from the distance of the particular target which is being tracked. Therefore the echo signals caused by a missile having at the critical moment practically the same distance from the antenna as the target itself, are received in the same manner as the echo signals caused by the target because the gating means cannot exclude the missile signals from being received, and vice versa.

It is therefore a main object of this invention to provide for a method and an apparatus for finding the relation between a missile trajectory and a target which is being tracked, in spite of the above described difficulty.

It is another object of this invention to provide for a method and apparatus for the purpose mentioned above, by which the momentary position of a missile located close to the momentary position of the moving target can be determined.

With above objects in view, a radar scanning apparatus for determining the relation between two objects one of which travels along a trajectory passing through the region in which the other object is located, comprises according to the invention, in combination, radar scanning means for tracking said other object and producing a main signal indicative of the region in which said other object is located; auxiliary scanning means for tracking said one object while it travels along said trajectory thereof and furnishing additional signals indicative of positions of said one object which are located at different predetermined distances, respectively, along said trajectory from said region of said other object of which said main signal is indicative, and indicator means combining the indications furnished by said main and additional signals in such a manner that by said indications combined position data are furnished for determining the relative position of said one object with respect to the position of said region of said other object at the moment when said one object passes through said region of said other object.

In another aspect of the invention, a method of determining the relation between two objects one of which travels along a trajectory passing through the region in which the other object is located, comprises according to the invention, the steps of, tracking said other object by means of a radar beam directed thereto and producing a main signal indicative of the position of the region in which said other object is located; tracking said one object while it travels along said trajectory thereof and obtaining additional signals indicative of positions of said one object which are located at different predetermined distances, respectively, from said region of said other object of which said main signal is indicative; and combining the indications furnished by said main and additional signals so that by said combined indications position data are furnished for determining the relative position of said one object with respect to the position of said region of said other object at the moment when said one object passes through said region of said other object.

The novel features which are considered as characteristic for the invention are set forth in particular in the appended claims. The invention itself, however, both as to its construction and its method of operation together with additional objects and advantages thereof, will be best understood from the following description of specific embodiments when read in connection with the accompanying drawing, in which:

FIG. 1 is a schematic diagram illustrating a preferred embodiment of the invention; and FIG. 2 is a schematic perspective diagram illustrating the relation between a radar beam, a missile trajectory, and the path of a moving target, and thus illustrates the method according to the invention.

The apparatus according to the invention, as illustrated by FIG. 1, comprises as one component a conventional radar scanning system which includes a radar antenna RS which is movable in order to follow a target, the antenna system having a directional axis RA and emitting a one-lobe radar beam the axis of which is continuously rotated around the axis RA so that the axis of the beam constitutes the generatrix of a slender cone concentric with the axis RA. The antenna RS is connected with a conventional transmitter-receiver apparatus ER which delivers the received echo signals caused by a target into a device $F_0$ which may or may not have a screen for visibly displaying the echo signals as they are received. The device $F_0$ is connected with a gating device $S_r$ which controls the device $F_0$ by means of a control voltage $r_0$ which is proportional to the momentary range or distance of the target that furnishes the echo signals. In this manner, as well known to the art, the device $F_0$ being the main receiving channel of the arrangement is prevented from responding to echo signals caused by objects located at a distance or range from said antenna differing from the momentary distance of a particular target which is being tracked. The above-mentioned echo signals $E_0'$ derived from the main channel or device $F_0$ are introduced into a converter $D_0$, also of conventional design, which breaks down the echo signal $E_0'$ into component signals proportional to the deviation of the position of the target from the directional axis of the antenna. These component signals, $\Delta\alpha_0'$ for the azimuthal deviation or positional coordinate, and $\Delta\lambda_0'$ for the elevational deviation or positional coordinate, are supplied to a servo-loop arrangement comprising in conventional manner controls $S\alpha$ and $S\lambda$ which, according to the application of the above mentioned component signals automatically control the orientation of the radar antenna RS so that the momentary deviations mentioned above are constantly reduced to zero. In this manner the antenna is capable of tracking the moving target.

According to the invention the above described arrangement is supplemented by two auxiliary receiving channels $F_1$ and $F_2$ which are essentially of the same type as the main receiving channel $F_0$. The auxiliary receiving channels are connected in parallel with the main receiving channel to the common transmitter-receiver circuit ER so as to be supplied in the same manner as described above with echo signals caused by objects hit by the radar beam. However, the auxiliary receiving channels $F_1$ and $F_2$ are gated in such a manner that these auxiliary receiving channels will respond only to echo signals caused by objects located at selected first and second selected distances, respectively, from the antenna RS differing predetermined amounts, respectively, from the distance of the target being tracked.

Before further describing the details of the arrangement of FIG. 1, the prevailing conditions will now be discussed in reference to FIG. 2. The line RA represents the radar beam originating at R$i$, while the line B$o$ represents the path of a moving target O which is being tracked by the radar beam RA. The dotted line B$g$ represents the trajectory of a missile aimed at the target O, but, in the illustrated situation, passes by the target O. In accordance with common practice the trajectory B$g$ has generally the same direction as the radar beam RA although not necessarily being parallel therewith. The frame $F_0'$ represents an imaginary plane transverse of the radar beam RA and passing through the target O. Consequently the range or distance of the target O from the point R$i$ is represented by the above mentioned control voltage $r_0$. The deviation of the trajectory B$g$ or the relative position of the missile with respect to the target O at the moment when both are located substantially in the plane $F_0'$ is indicated by the arrow $f_0$ which deviation can be expressed in a well known manner by positional coordinates in azimuthal and elevational directions. The determination of these positional coordinates in the plane $F_0'$ is the information to be furnished by using the method and apparatus according to the invention.

The frame $F_1'$ illustrates an imaginary auxiliary plane transverse of the radar bear RA at a predetermined distance $\Delta r$ along the radar beam on the near side of the target O, while the frame $F_2'$ illustrates a similar imaginary plane at a predetermined distance $\Delta r$ on the far side of the target O. Obviously the trajectory B$g$ will pass also through the auxiliary planes just described, and the deviation of the trajectory or the positional coordinates of the missile in the first plane will appear as illustrated by the arrow $f_1$, and similarly the corresponding deviation and the corresponding positional coordinates in the second auxiliary plane will appear as represented by the arrow $f_2$.

It will be understood that in the arrangement according to FIG. 1 it is desired that the auxiliary receiving channel $F_1$ responds only to echo signals caused by the missile travelling along the trajectory B$g$ at the moment when the missile passes through the plane represented by the frame $F_1'$. Similarly the auxiliary receiving channel $F_2$ is intended to respond only to echo signals caused by the missile while passing through the plane represented by the frame $F_2'$. Therefore, the gating means cooperating with the auxiliary receiving channels operate as follows. The control voltage $r_0$ related to the momentary distance or range of the target O is taken from the gating circuit $S_r$ to a junction point $p$ and led into a voltage subtracting and increasing device K from where gating control voltages $r_1$ and $r_2$ are taken to the respective auxiliary receiving channels $F_1$ and $F_2$, respectively. However, the control voltages $r_1$ and $r_2$ differ from the control voltage $r_0$ by predetermined negative and positive amounts, respectively, proportional to the above mentioned predetermined distances $\Delta r$. For this purpose an additional control voltage proportional to $\Delta r$ is taken from a source B via a potentiometer P to a junction point $p'$ leading into the voltage subtracting and increasing device K, of any suitable design, wherein the additional control voltage proportional to $\Delta r$ is added to $r_0$ by series insertion or by any known means, so that $r_2$ is equal to $r_0$ plus $\Delta r$. Similarly, the voltage $r_0$ is reduced in device K by any known resistance or other means so that $r_1$ equals $r_0$ minus $\Delta r$. Thus $r_1$ and $r_2$, being respectively equally less and greater than $r_0$ are fed to the auxiliary receiving channels $F_1$ and $F_2$, respectively. In this manner the auxiliary receiving channels are so controlled that they will respond only to echo signals caused by the missile while passing through the first and second auxiliary planes mentioned above.

It can be seen, therefore, that if the missile passes through the radar beam in the auxiliary plane represented by frame $F_1'$ an echo signal $E_1$ will be furnished by the auxiliary receiving channel $F_1$. Similarly, if the missile passes through the radar beam in the second auxiliary plane represented by the frame $F_2'$, an echo signal $E_2$ will be furnished by the auxiliary receiving channel $F_2$. These echo signals are introduced into converters $D_1$ and $D_2$, respectively, similar to the above described converter $D_0$. The converter $D_1$ furnishes, in the manner described above, component signals $\Delta\alpha_1$ and $\Delta\lambda_1$, respectively, representing the positional coordinates in the plane represented by the frame $F_1'$. From the converter $D_2$ similar component signals $\Delta\alpha_2$ and $\Delta\lambda_2$, respectively, representing the positional coordinates in the second auxiliary plane represented by the frame $F_2'$ are obtained. Such pairs of component signals would correspond to the above mentioned deviations $f_1$ and $f_2$, respectively, as indicated in FIG. 2.

In order to obtain the desired indications it is necessary to apply the just mentioned component signals to a conventional cathode ray tube S which is illustrated diagrammatically together with the conventional pairs of deflection electrodes arranged, respectively, in the direction of the coordinates $\lambda$ for elevational deviation and $\alpha$ for azimuthal deviation. Hereby the positional coordinates of the missile or missiles at the moment of passing through the above mentioned auxiliary planes are to be displayed visibly. It should be noted that instead of using a single cathode ray tube in cooperation with both auxiliary converters $D_1$ and $D_2$, separate cathode ray tubes could be provided and connected separately with the just mentioned converters, respectively. However, it will be understood that it is far more convenient to have both indications about the missile positions in the two auxiliary planes displayed on one single screen.

Therefore, the invention provides auxiliary means for combining the indication of the momentary position of the target, or of the region in which the target is momentarily located, with the indications of the deviations of the trajectory from the radar beam. Accordingly, the lines connecting the auxiliary receiving channels $F_1$ and $F_2$ with the associated converters $D_1$ and $D_2$, respectively, are tapped for connecting these lines with pulse detector devices $Q_1$ and $Q_2$, respectively, which are of generally known design and furnish a distinct output voltage when an echo signal $E_1$ or $E_2$ is present, while they do not furnish an output voltage when only the receiver noise is present at their inputs. Consequently, these pulse detectors furnish either an output voltage of the value 1 or an output voltage of the value 0 depending upon whether an echo signal $E_1$ or $E_2$ is applied thereto. The output voltages of values of 0 or 1 from the pulse detectors $Q_1$ and $Q_2$ are introduced into a comparator circuit T which is a conventional logical circuit of the "AND-OR" type which has three output terminals $a_1$, $a_2$ and $a_0$. The rectangle representing the comparator circuit T shows in FIG. 1 a diagram illustrating the reaction of the comparator circuit to different combinations of output voltages received from the above-mentioned pulse detectors. In operation, the comparator circuit T furnishes discrete output voltages $U_0$, $U_1$ and $U_2$ depending upon which combinations of output voltages are furnished by the pulse detectors. When both voltages applied to the comparator T have the value 0 (combination 00) then a voltage $U_0$ appears at the output terminal $a_0$ which may be introduced into the cathode ray tube S for reducing the cathode ray emission to 0. If the output voltage from the pulse detector $Q_1$ has the value 1 while the output voltage from the pulse detector $Q_2$ has the value 0 (combination 10), then an output voltage $U_1$ appears at the output terminals $a_1$. If the output voltage from the pulse detector $Q_1$ has the value 0 and the output voltage of the other pulse detector $Q_2$ has the value 1 (combination 01), then an output voltage $U_2$ appears at the output terminal $a_2$.

The output voltages $U_1$ and $U_2$ are applied to switch devices $C\alpha$ and $C\lambda$, respectively, of which the first one is connected between that deflection system of the tube S which controls the deflection in the direction of the coordinate $\alpha$, and those output terminals of the converters $D_1$ and $D_2$ which furnish the component signals $\Delta\alpha_1$ and $\Delta\alpha_2$, respectively. Similarly, the second switch is connected between the deflection system controlling the deflection in the direction of the coordinate $\lambda$ and the output terminals of the converters $D_1$ and $D_2$ furnishing the component signals $\Delta\lambda_1$ and $\Delta\lambda_2$, respectively. By application of the voltage $U_1$ to the switches $C\alpha$ and $C\lambda$ the switch arms or equivalent elements thereof are so controlled that only the components signals from the converter $D_1$ are applied to the two pairs of deflection systems. The application of voltage $U_2$ operates similarly so as to apply only the component signals from the converter $D_2$ to the two deflection systems. Now it will be understood that in the case when output voltages of the value 1 are furnished by both pulse detectors $Q_1$ and $Q_2$ (combination 11) the voltages $U_1$ and $U_2$ will be produced alternatingly so that in this case the switches $C\alpha$ and $C\lambda$ are both changed alternatingly between one and the other switching position thereof. It is to be understood that the screen of the cathode ray tube S is supposed to be of the well known afterglow type so that a light spot produced by an echo signal will remain visible for some time even if the cathode ray producing the light spot has been extinguished or deflected to a different point of the screen.

In operation the method and apparatus according to the invention function as follows. As illustrated by FIG. 2, a target O, which may be an airplane travelling along the path $Bo$, is continuously tracked by a radar installation located at the point $Ri$ and illustrated in FIG. 1, so that the directional axis RA of the antenna RS remains continuously directed at the target O. During this tracking operation the main receiving channel $F_0$ responds only to the echo signals $E_0$, caused by objects located at a range or distance corresponding to the gating control voltage $r_0$. For the sake of accuracy it may be stated at this point that the gating control will hardly be so accurate as to define actually a plane as illustrated in FIG. 2 with an absolute exclusion of response to signals originating outside such mathematical plane. In reality there is a certain leeway of between 100 and 200 feet in both directions in front and in the rear of the theoretical plane. The same applies also to the auxiliary planes represented by the frames $F_{1'}$ and $F_{2'}$. However it will be understood that if the distances $\Delta r$ are chosen reasonably large, the above mentioned slight inaccuracy does not affect the desired result.

If it is now desired to combat a target O with shells from an antiaircraft gun or with missiles from a missile launcher under the control of any gun laying or fire control device, it can be assumed that the missiles or shells will move along trajectories $Bg$ which approximately intersect the path $Bo$ at the target O. In order to determine the accuracy of fire it is desirable to find the deviation $f_0$ of the missile or shell in the plane represented by the frame $F_{0'}$, or rather the corresponding positional coordinates thereof $\Delta\alpha_0$ and $\Delta\lambda_0$. As stated above, this would not be possible with conventional radar equipment because the echo signals caused by the missile in such position would not be distinguishable from the echo signals caused by the target O. However, in accordance with the invention a clear indication of the deviation $f_1$ in the first auxiliary plane and of the deviation $f_2$ in the second auxiliary plane can be obtained and from these two indications in relation to the indicated position of the target O, the desired indication of the deviation $f_0$ can be determined.

Referring to the example illustrated by FIG. 2, it can be seen that if no missile passes through the first auxiliary plane $F_{1'}$, the combination 00 is applied to the comparator T and no signal appears on the screen of the tube S. If however a missile passes through the first auxiliary plane $F_{1'}$ the voltage combination 10 is applied to the comparator T so that on the screen a spot $E_1$ corresponding to the respective echo signal $E_1$ will appear so as to indicate on the screen the deviation $f_1$ from the center point 0 which always represents the momentary location of the target O. If thereafter, approximately 100 to 500 milliseconds later the same missile passes through the second auxiliary plane $F_{2'}$, the voltage combination 01 is applied to the comparator T so that now a spot $E_2$ corresponding to the echo signal $E_2$ appears on the screen indicating the deviation $f_2$. Since the screen has sufficient afterglow both light spots $E_1$ and $E_2$ can be observed simultaneously and may be for instance photographed. By interpolation, i.e., by dividing the distance between the spots $E_1$ and $E_2$ in half the location of the point $E_0$ can be found so that hereby the deviation $F_0$ and even the positional coordinates in relation to the point 0 on the screen are determined.

In practice it may occur that not single missiles but a burst of a series of missiles is released consecutively toward the target. In this case it can easily occur that the first missiles of the series pass through the second auxiliary plane $F_{2'}$ while the last missiles of the series just pass through the first auxiliary plane $F_{1'}$. In this case the comparator T would be supplied with the voltage combination 11 in which case the switching devices $C\alpha$ and $C\lambda$ are alternatively switched between their two positions. Also in this case the two light spots $E_1$ and $E_2$, each representing a plurality of missiles consecutively passing through the respective planes, will be visible simultaneously on the screen of the tube S. Consequently also in this case the relation between the trajectory and the target O can be determined in the above described manner by interpolation so as to obtain the elevation and azimuth deviations from the target.

While in the above example it has been assumed that the control voltages $r_1$ and $r_2$ differ in opposite directions from the control voltage $r_0$ which means that one auxiliary plane is determined in front of the target O and a second auxiliary plane aat the same distance beyond the target O, it is obvious that this system could be modified in a simple manner so that both auxiliary planes are located in front of the target or both auxiliary planes are located beyond the target. In this case, no interpolation will be applied in evaluating the indications on the screen of tube S, but rather extrapolation.

This latter system may be particularly useful if the missiles are explosive shells equipped with an adjustable time fuse. Under these circumstances it is desirable to predetermine the moment when such a missile will arrive in the range of the target O. By determining the location data of the shell in an area substantially nearer than the target, the extrapolation of the data of the trajectory can be carried out e.g. by extrapolation devices or calculators of known type so that in this manner with substantial accuracy the moment can be predetermined at which the missile will arrive in the region where the target is located. In this case not only the location of the shell at the moment of arriving in the region of the target can be extrapolated in terms of elevation and azimuth, but it can even be determined whether the explosion of the shell occurs just in that moment when the missile is nearest to the region of the target O which means it will be determined whether the timing of the fuse is correct. However, in this case it would be desirable to use additionally a photographic camera continuously directed at the target and actuated for taking a picture at the respective moment.

It will be understood, that the method according to the invention can be carried out also by apparatus different from the preferred embodiment described and illustrated. On the other hand, it can be seen that the arrangements as described and illustrated is of particular simplicity and reliability.

While the function of the preferred embodiment of the invention has been described above in detail, it appears that hereby implicitly also the method has been described sufficiently so that a separate description of the method would not be necessary.

It will be understood that each of the elements described above or two or more together may also find a useful application in other types of a method and apparatus for determining the relation between two objects one of which travels along a trajectory passing through the region in which the other object is located differing from the types described above.

While the invention has been illustrated and described as embodied in a method and apparatus for finding the relation between a missile trajectory and a moving target, it is not intended to be limited to the details shown, since various modifications and structural changes may be made without departing in any way from the spirit of the present invention.

Without further analysis the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed and desired to be secured by Letters Patent is:

1. Radar scanning apparatus for finding the relation between a missile trajectory and a target, comprising, in combination, radar scanning means including a movable radar antenna emitting a radar beam, a main receiving channel connected with said antenna for receiving echo signals, and a servo-loop deriving from said echo signals electric signals for controlling the movement of said antenna so as to track a target causing said echo signals, said scanning means further including first gating means preventing response of said main receiving channel to echo signals caused by objects located at a distance from said antenna differing substantially from the distance of a particular target being tracked; a first and a second auxiliary receiving channel connected in parallel with said main receiving channel, each of said auxiliary receiving channels including auxiliary gating means adjustable for permitting response of the respective auxiliary receiving channel only to echo signals caused by movable objects located at selected first and second distances, respectively, from said antenna differing by greater and lesser predetermined amounts, respectively, from the distance of the target being tracked; and indicator means cooperating with said auxiliary receiving channels for indicating in relation to said radar beam the positional coordinates, respectively, of a missile passing through said radar beam at either one of said selected first and second distances, said indicator means comprising a cathode ray oscillograph having deflector means and a long-afterglow screen for displaying at substantially the same time in elevational and azimuthal coordinates said echo signals caused by a missile when located at said first and second distances, respectively, and control circuit means connecting said oscillograph with said first and second auxiliary receiving channels for deriving therefrom component signals respectively, of echo signals received by whichever one of said auxiliary receiving channels, and for applying such component signals to said oscillograph, whereby it is possible to determine by interpolation from said two visually exhibited indications of missile positions the relative position of such missile with respect to the target at the moment when the missile is at a distance substantially equal to that of the target.

2. Radar scanning apparatus for finding the relation between a missile trajectory and a target, comprising, in combination, radar scanning means including a movable radar antenna emitting a radar beam, a main receiving channel connected with said antenna for receiving echo signals, and a servo-loop deriving from said echo signals electric signals for controlling the movement of said antenna so as to track a target causing said echo signals, said scanning means further including first gating means preventing response of said main receiving channel to echo signals caused by objects located at a distance from said antenna differing substantially from the distance of a particular target being tracked; a first and a second auxiliary receiving channel connected in parallel with said main receiving channel, each of said auxiliary receiving channels including auxiliary gating means adjustable for permitting response of the respective auxiliary receiving channel only to echo signals caused by objects located at selected first and second distances, respectively, from said antenna differing predetermined amounts, respectively, from the distance of the target being tracked; and indicator means cooperating with said auxiliary receiving channels for indicating in relation to said radar beam the positional coordinates, respectively, of a missile passing through said radar beam at either one of said selected first and second distances, said indicator means comprising a cathode ray oscillograph having deflector means and a long-afterglow screen for displaying in elevational and azimuthal coordinates said echo signals caused by a missile located at said first and second distances, respectively, and control circuit means connecting said oscillograph with said first and second auxiliary receiving channels for deriving therefrom component signals respectively, of echo signals received by whichever one of said auxiliary receiving channels, and for applying such component signals to said oscillograph, said control circuit means comprising change-over switch means for connecting said deflector means alternatively with said first and second auxiliary receiving channels, respectively, and switch actuating means connected with said first and second auxiliary receiving channels, respectively, for changing said switch means between the respective switch positions thereof depending upon which of said auxiliary receiving channels carries an echo signal, whereby it is possible to determine by interpolation or extrapolation from said two indications of missile positions the relative position of said missile with respect to the target at the moment when the missile is at a distance substantially equal to that of the target.

References Cited by the Examiner

UNITED STATES PATENTS

| | | | |
|---|---|---|---|
| 3,051,946 | 8/62 | Straehl | 343—7.3 |
| 3,054,101 | 9/62 | Pastoriza | 343—7 |
| 3,068,468 | 12/62 | Bretscher et al. | 343—12 |

CHESTER L. JUSTUS, *Primary Examiner.*